United States Patent
Ohayon et al.

(10) Patent No.: US 12,225,388 B1
(45) Date of Patent: Feb. 11, 2025

(54) MACHINE LEARNING-BASED SYSTEM, METHOD, AND COMPUTER PROGRAM FOR MAKING A 5G PRIVATE NETWORK DEPLOYMENT RECOMMENDATION

(71) Applicant: Amdocs Development Limited, Limassol (CY)

(72) Inventors: Jean-marc Eric Ohayon, Givat Shmuel (IL); Gil Mazurik, Hod Hasharon (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 831 days.

(21) Appl. No.: 17/410,894

(22) Filed: Aug. 24, 2021

(51) Int. Cl.
    *H04W 16/18* (2009.01)
    *G06N 5/04* (2023.01)
    *H04W 16/14* (2009.01)
    *H04W 48/18* (2009.01)

(52) U.S. Cl.
    CPC .............. *H04W 16/18* (2013.01); *G06N 5/04* (2013.01); *H04W 16/14* (2013.01); *H04W 48/18* (2013.01)

(58) Field of Classification Search
    CPC ..... H04W 16/18; H04W 16/14; H04W 48/18; G06N 5/04
    See application file for complete search history.

(56) References Cited

U.S. PATENT DOCUMENTS

| 10,498,609 | B1 | 12/2019 | Barbiro |
| 2009/0125356 | A1 | 5/2009 | Allen |
| 2022/0417757 | A1* | 12/2022 | Gupta ..................... H04W 4/50 |
| 2023/0388196 | A1* | 11/2023 | Mozaffari ............... H04L 41/16 |
| 2024/0129816 | A1* | 4/2024 | Zhang ............... H04W 36/0072 |

FOREIGN PATENT DOCUMENTS

| EP | 1324534 A1 | 7/2003 |
| WO | 2020247934 A1 | 12/2020 |

* cited by examiner

*Primary Examiner* — Curtis B Odom
(74) *Attorney, Agent, or Firm* — Zilka-Kotab, P.C.

(57) ABSTRACT

As described herein, a system, method, and computer program are provided for making a 5G private network deployment recommendation using machine learning. A plurality of parameter values associated with an enterprise for which a 5G private network is to be deployed are obtained. A machine learning model is used to infer, for the enterprise, an optimal deployment scenario for the 5G private network among a plurality of available deployment scenarios, based on the plurality of parameter values. An indication of the optimal deployment scenario is output as a recommendation for deploying the for the 5G private network for the enterprise.

19 Claims, 5 Drawing Sheets

MACHINE LEARNING-BASED SYSTEM, METHOD, AND COMPUTER PROGRAM FOR MAKING A 5G PRIVATE NETWORK DEPLOYMENT RECOMMENDATION

FIELD OF THE INVENTION

The present invention relates to solutions used for 5G private networks.

BACKGROUND

Private 5G networks for Enterprise are emerging to address the performance and security requirements of enterprises' crucial applications. As a result, there are many deployment scenarios that can be provided as solutions for a 5G private enterprise network (PEN). However, selecting the right deployment scenario for a private enterprise, usually by humans during a Business-to-Business (B2B) Telco Sales Process, is a complex and time-consuming task.

In particular, each solution has a different price and cost (which can be both one time and recurring), and each solution has its own respective advantages and disadvantages. For example, in term of cost, the security, control, performance and operational complexity may be impacted differently for the various available solutions. Besides the time consuming nature of selecting the right deployment scenario, current human-reliant processes may also result in selection of a 5G PEN solution for an enterprise that is not necessarily optimal for that specific enterprise. It should be noted that the same and/or similar issues also arise for other types of 5G private networks.

There is thus a need for addressing these and/or other issues associated with the prior art.

SUMMARY

As described herein, a system, method, and computer program are provided for making a 5G private network deployment recommendation using machine learning. A plurality of parameter values associated with an enterprise for which a 5G private network is to be deployed are obtained. A machine learning model is used to infer, for the enterprise, an optimal deployment scenario among a plurality of available deployment scenarios, based on the plurality of parameter values. An indication of the optimal deployment scenario is output as a recommendation for deploying the 5G private network for the enterprise.

DETAILED DESCRIPTION

Figure 1:
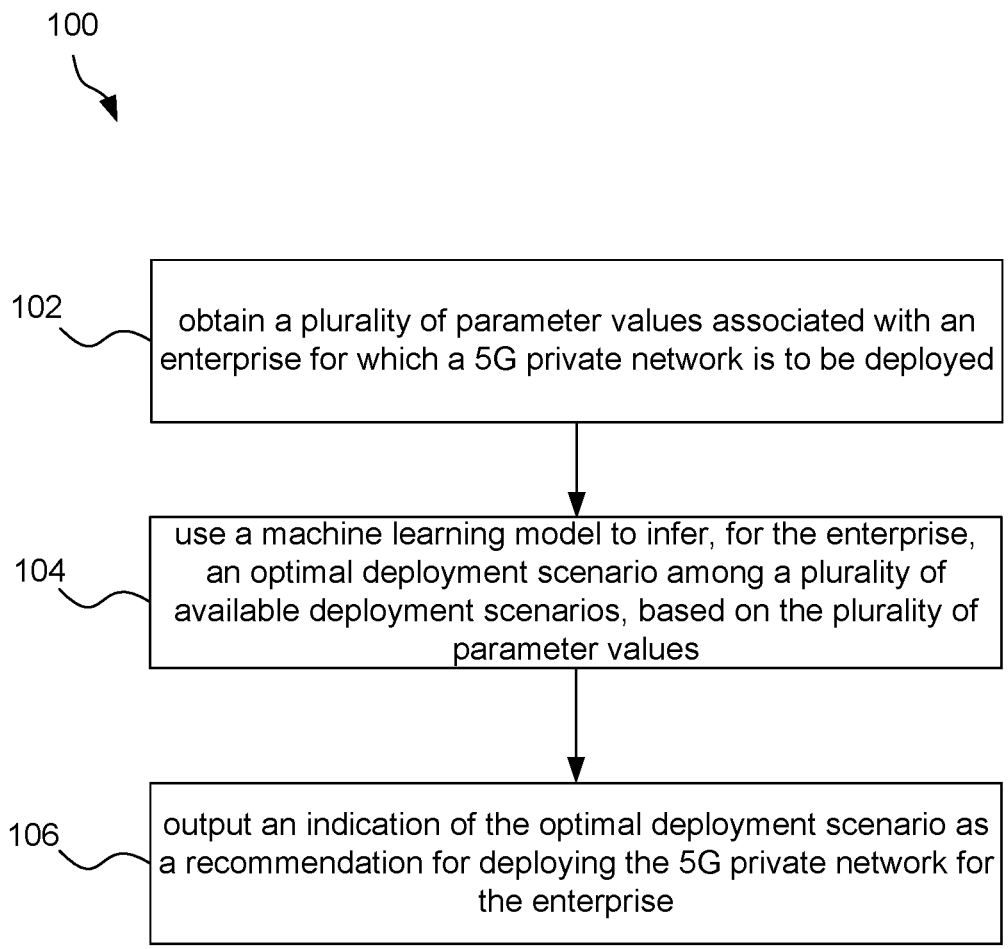
FIG. 1 illustrates a method for making a 5G private network deployment recommendation using machine learning, in accordance with one embodiment.

FIG. 1 illustrates a method 100 for making a 5G private network deployment recommendation using machine learning, in accordance with one embodiment. The method 100 may be performed by any computer system, such as those described below with reference to FIGS. 4 and/or 5. In one embodiment, the method 100 may be performed by system of a vendor capable of providing one or more 5G private network-related services to customers (enterprises).

In the context of the present description, the 5G private network refers to any network that uses 5G technology and that is configured for an enterprise (e.g. according to the requirements, needs, etc. of the enterprise). Examples of the 5G private network include a 5G Private Enterprise Network (PEN), a 5G Mobile Private Network (5G MPN), a 5G Enterprise Network, a Private 5G Network, and/or a Private Cellular Network. It should be noted that any specific description herein related to any of these types of 5G private networks may equally apply to any of the other types of 5G private networks.

In operation 102, a plurality of parameter values associated with an enterprise for which a 5G private network is to be deployed are obtained. The parameter values may refer to values for predefined parameters associated with the 5G private network. For example, the values may indicate requirements (e.g. needs, wants, etc.) of the enterprise for the various parameters associated with the 5G private network.

In one embodiment, the predefined parameters may include one or more parameters for information describing the enterprise, such as size of the enterprise, market within which the enterprise operates (e.g. energy, healthcare, etc.), etc. In another embodiment, the predefined parameters may include one or more parameters for quality of service needs of the enterprise, such as reliability (e.g. with values selected from low, medium, high), connection speed (e.g. with values selected from low, medium, high), and latency (e.g. with values selected from low, medium, high).

In yet other embodiments the predefined parameters may include one or more parameters for importance of security to the enterprise (e.g. with values selected from low, medium, high), importance of control to the enterprise (e.g. with values selected from low, medium, high), ability to maintain complex network operations (e.g. with values selected from low, medium, high), number of devices to be connected to the 5G private network (e.g. with values selected from low, medium, high), budget for the 5G private network, and/or budget for maintenance (e.g. yearly) of the 5G private network.

The plurality of parameter values may be obtained from user input (e.g. provided in a user interface of an application). The user input may be provided one or more representatives of the enterprise, or by a sales agent in communication with one or more representatives of the enterprise, for example. In another embodiment, the plurality of parameter values may be obtained from a database in which the parameter values are stored (e.g. by the application).

In operation 104, a machine learning model is used to infer, for the enterprise, an optimal deployment scenario for the 5G private network among a plurality of available deployment scenarios, based on the plurality of parameter values. The available deployment scenarios refer to existing deployment configurations that can be used to implement 5G private networks.

In one embodiment, the available deployment scenarios include a physically-isolated 5G private network. By way of example, the physically-isolated 5G private network is independent of a mobile operator's public 5G network and components of the 5G private network are deployed within a premise of the enterprise and are private and dedicated to the enterprise.

In another embodiment, the available deployment scenarios include radio access network (RAN) sharing between a private network (e.g. of the enterprise) and a public network (e.g. of the mobile operator's public 5G network). By way of example, the RAN sharing between the private network and the public network includes deploying components of the 5G private network within a premise of the enterprise, where only 5G base stations are shared between the private network and the public network and remaining components of the 5G private network are private and dedicated to the enterprise.

In yet another embodiment, the available deployment scenarios include RAN and control plane sharing between a private network and a public network. By way of example, the RAN and control plane sharing between the private network and the public network includes deploying a first subset of components of the 5G private network within a premise of the enterprise that are private and dedicated to the enterprise, deploying a second subset of components of the 5G private network within the premise of the enterprise that are shared between the private network and the public network, and deploying a third subset of components of the 5G private network in a mobile operator's public 5G network, where the first subset of components are physically separated between the private network and the public network, and where the second subset of components and the third subset of components are logically separated between the private network and the public network.

In still yet another embodiment, the available deployment scenarios include end to end network slicing including RAN and core sharing between a private network and a public network. The end to end network slicing including RAN and core sharing between a private network and a public network includes deploying only 5G base stations within a premise of the enterprise, and deploying at least two other components of the 5G private network in a mobile operator's public 5G network, where components of the 5G private network are logically separated between the private network and the public network.

Table 1 illustrates various embodiments of the available deployment scenarios.

TABLE 1

| Name | Description | Type |
| --- | --- | --- |
| Physically-isolated private 5G network (5G island) | Independent of the mobile operator's public 5G network. The entire 5G Network [Full Set: NB (narrow band), UPF (user plane function), 5GC CP (5G core control plane), UDM (unified data management), MEC (multi-access edge computing)] is deployed within its premise (site/building) | Dedicated |
| RAN sharing between private network and public network | UPF, 5GC CP, UDM, and MEC are deployed in the enterprise and physically separated from the public network. Only 5G base stations (gNBs) located within the enterprise are shared between private and public network (RAN Sharing). | Hybrid |

TABLE 1-continued

| Name | Description | Type |
| --- | --- | --- |
| RAN and Control Plane Sharing between private and public network | Private and dedicated UPF, MEC are built in enterprise. 5G base stations (gNBs) in enterprise and 5GC CPs, UDMs in mobile operator's edge cloud are shared between private and public networks (RAN and Control Plane Sharing). The gNB, 5GC CP, and UDM are logically separated between the private network and the public network, and the UPF and MEC are physically separated. | Hybrid |
| End to End Network slicing (RAN and core sharing between private and public network) | Only gNB is deployed inside the enterprise and UPF and MEC exist only in the mobile operator's edge cloud. Private network and public network share "logically separated 5G RAN and Core" (gNB, UPF, 5GC, MEC, UDM) (End-to-End Network Slicing). | Virtual |

It should be noted that the available deployment scenarios may be associated with different advantages and disadvantages. For example, the available deployment scenarios may be associated with (e.g. provide, enable, require, etc.) different values for a subset of, or all of, the predefined parameters described above. Table 2 illustrates the exemplary parameter values that may be associated with the various available deployment scenarios.

TABLE 2

| Name | Cost (Price) | Security and Control | Performance Assurance | Operational Complexity |
| --- | --- | --- | --- | --- |
| Physically-isolated private 5G network (5G island) | High | High | High | High |
| RAN sharing between private network and public network | Medium | High | High | Medium |
| RAN and Control Plane Sharing between private and public network | Low | Medium | High | Medium |
| End to End Network slicing (RAN and core sharing between private and public network) | Low | Low | Medium | Low |

As noted above, a machine learning model is used to infer, for the enterprise, an optimal deployment scenario for the 5G private network among the available deployment scenarios, based on the parameter values obtained for the enterprise. The machine learning model may be any model trained by a machine learning algorithm using training data to infer which of the available deployment scenarios is optimal for the enterprise based on the parameter values obtained for the enterprise.

In one embodiment, the machine learning model may be generated using a supervised machine learning process. For example, the supervised machine learning process may be performed on training data that includes previous deployment scenarios recommended, or used, for other enterprises with corresponding parameter values. The previous deployment scenarios may refer to deployment scenarios manually determined/selected for enterprises based on the parameter values of those enterprises.

To this end, the parameter values obtained for the enterprise may be input to the machine learning model. The machine learning model may then output the optimal deployment scenario for the 5G private network of the enterprise.

In operation 106, an indication of the optimal deployment scenario is output as a recommendation for deploying the 5G private network for the enterprise. For example, the indication of the optimal deployment scenario may be output in a user interface (e.g. of the application mentioned above). The indication of the optimal deployment scenario may be output to the one or more representatives of the enterprise, or to the sales agent in communication with one or more representatives of the enterprise, for example. In another embodiment, the indication of the optimal deployment scenario may be output to a database (e.g. associated with the application).

In an embodiment, an indication of one or more of the parameter values primarily influencing which of the plurality of available deployment scenarios is inferred as the optimal deployment scenario for the enterprise may also be output (e.g. in the user interface, etc.). For example, the primary influential parameter values may be output by the machine learning model along with the indication of the optimal deployment scenario. Thus, for example, the one or more representatives of the enterprise and/or the sales agent may view the primary parameter values influencing which of the available deployment scenarios is inferred as the optimal deployment scenario for the enterprise.

In yet another embodiment, the indication of the optimal deployment scenario may be output as part of an offer for deploying the 5G private network. The offer may be provided to the one or more representatives of the enterprise, along with a price for deploying the 5G private network in accordance with the optimal deployment scenario. The optimal deployment scenario may then be caused to be deployed upon acceptance of the offer by the one or more representatives of the enterprise. In this embodiment, by using the machine learning model to obtain the recommendation of which of the available deployment scenarios to offer to the enterprise, the recommended deployment scenario may be ensured to be the most applicable to the parameter values of the enterprise, thus maximizing a probability of the enterprise accepting the offer to deploy the 5G private network and reducing a number of sales cycles required from a lead to offer acceptance.

In another embodiment, a network service may be initiated to deploy the optimal deployment scenario for the enterprise, based on the recommendation. For example, the network service may correspond, in a catalog, to the available deployment scenario identified as the optimal deployment scenario. In this way, the optimal deployment scenario may be deployed for the enterprise based on the recommendation output by the machine learning model. Deploying the optimal deployment scenario may include deploying components of the 5G private network, in accordance with the optimal deployment scenario. To this end, a probability of customer (enterprise) satisfaction may be maximized by providing the optimal deployment scenario to the enterprise.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
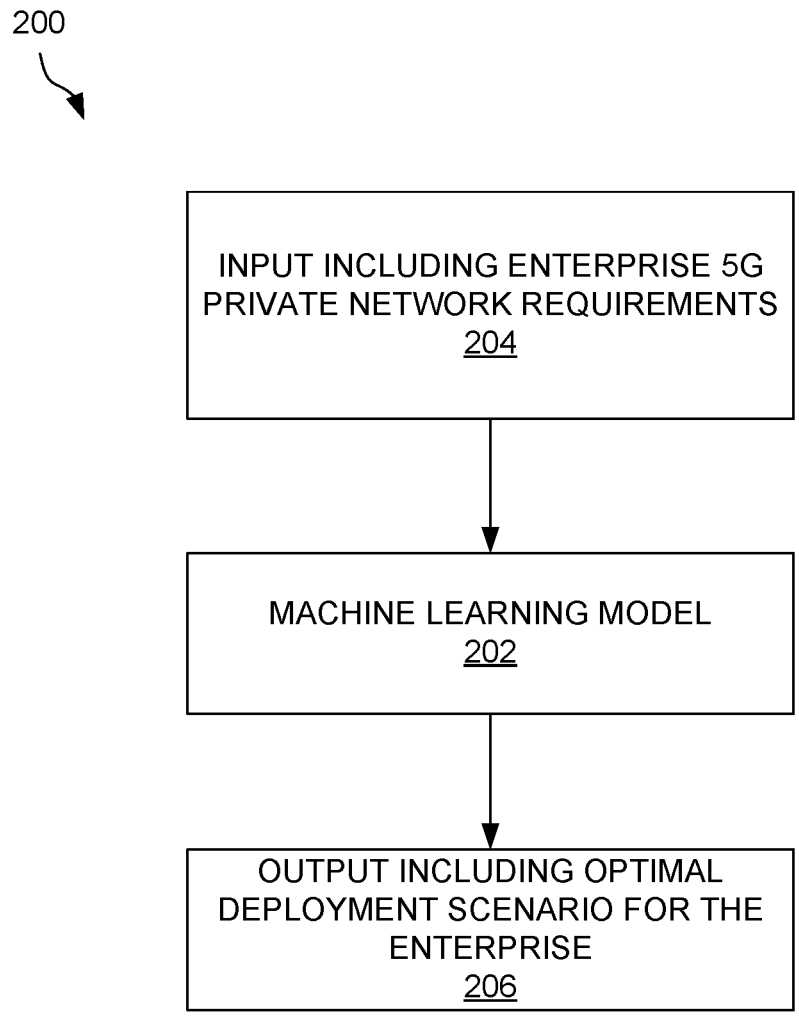
FIG. 2 illustrates a block diagram of an input and output flow for a machine learning model that infers an optimal 5G private network deployment scenario for an enterprise, in accordance with one embodiment.

FIG. 2 illustrates a block diagram of an input and output flow 200 for a machine learning model that infers an optimal 5G private network deployment scenario for an enterprise, in accordance with one embodiment. As an option, the input and output flow 200 may be implemented in the context of the details of the previous figure and/or any subsequent figure(s). Of course, however, the input and output flow 200 may be implemented in the context of any desired environment. Further, the aforementioned definitions may equally apply to the description below.

As shown, a machine learning model 202 is provided to infer (e.g. predict) an optimal 5G private network deployment scenario for an enterprise, from among a plurality of available 5G private network deployment scenarios. The machine learning model 202 may be generated by training a machine learning algorithm to infer the optimal 5G private network deployment scenario per parameters values defined for the enterprise. In one embodiment, the machine learning model may be generated using a supervised machine learning process which takes as input a plurality of historical records of a plurality of 5G private network deployment scenarios recommended, or deployed, for various enterprises with different combinations of parameters values. The supervised machine learning process may also consider information associated with customer satisfaction of those various enterprises with respect to the deployed 5G private network deployment scenarios (e.g. whether explicitly collected from the enterprises, such as via a questionnaire, or whether inferred from subsequent actions taken by the enterprises, such as not accepting an offer for the deployment scenario or cancelling a service for the 5G private network).

Table 3 illustrates enterprise parameters that may be used to train the machine learning algorithm.

TABLE 3

1. Enterprise information: Size, Market (Energy, Healthcare . . . ).
2. Quality of Service Needs: Ultra Low Reliability, Faster Connection Speed, Lower latency
3. Security importance (High, Medium, Low)
4. Control importance (High, Medium, Low)
5. Ability to maintain complex network operations (High, Medium, Low).
6. Number of devices that should be connected (High, Medium, Low).
7. Budget to buy the solution.
8. Budget for maintenance (yearly).

After the machine learning model 202 is generated, the system will send enterprise values for one or more of the parameters as input 204 to the model 202, which will process the values to provide as output 206 an optimal 5G private network deployment scenario for the enterprise.

Figure 3:
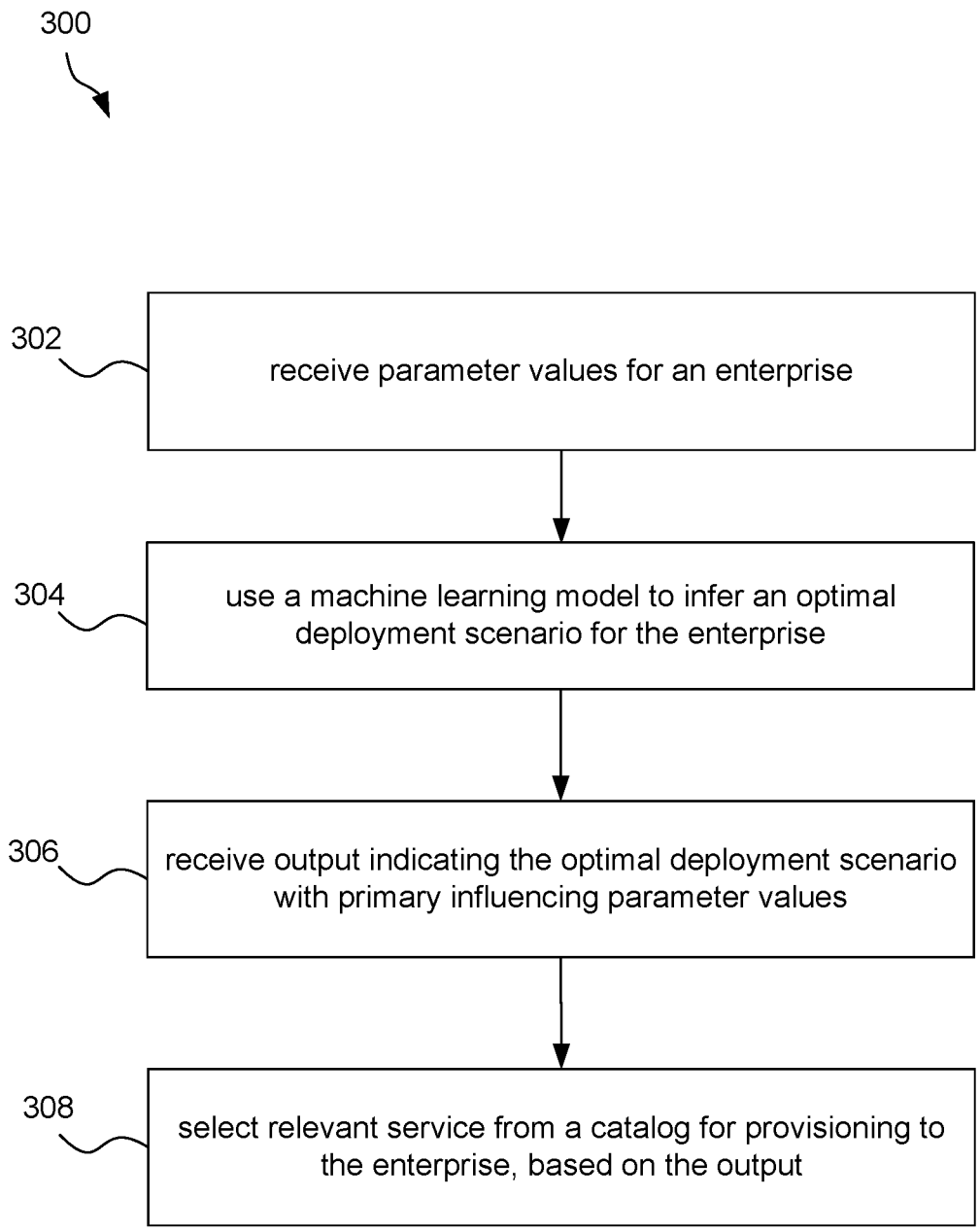
FIG. 3 illustrates a method for using a machine learning model to make a 5G private network deployment recommendation for an enterprise, in accordance with one embodiment.

FIG. 3 illustrates a method 300 for using a machine learning model to make a 5G private network deployment recommendation for an enterprise, in accordance with one embodiment. As an option, the method 300 may be carried out in the context of the details of the previous figure and/or any subsequent figure(s). Of course, however, the method 300 may be carried out in the context of any desired environment. For example, the method 300 may utilize the machine learning model 202 of FIG. 2. Further, the aforementioned definitions may equally apply to the description below.

In operation 302, parameter values for an enterprise are received. The parameter values correspond to information relevant to deploying a 5G private network for the enterprise.

In operation 304, a machine learning model (e.g. model 202 of FIG. 2) is used to infer an optimal deployment scenario for deploying the 5G private network for the enterprise. In other words, the machine learning model outputs, per enterprise parameter values, a deployment scenario inferred (e.g. predicted) as optimal for the enterprise. The inference may be made, for example, as described with respect to method 100 of FIG. 1 and/or the input/output flow 200 of FIG. 2.

In operation 306, output indicating the optimal deployment scenario for the enterprise and the primary influencing parameter values is received (e.g. from the machine learning model). The output may be provided in a user interface, in one embodiment.

In operation 308, a relevant service is selected from a catalog for provisioning to the enterprise, based on the output. The relevant service refers to a network service that deploys the particular optimal 5G private network deployment scenario for the enterprise.

Figure 4:
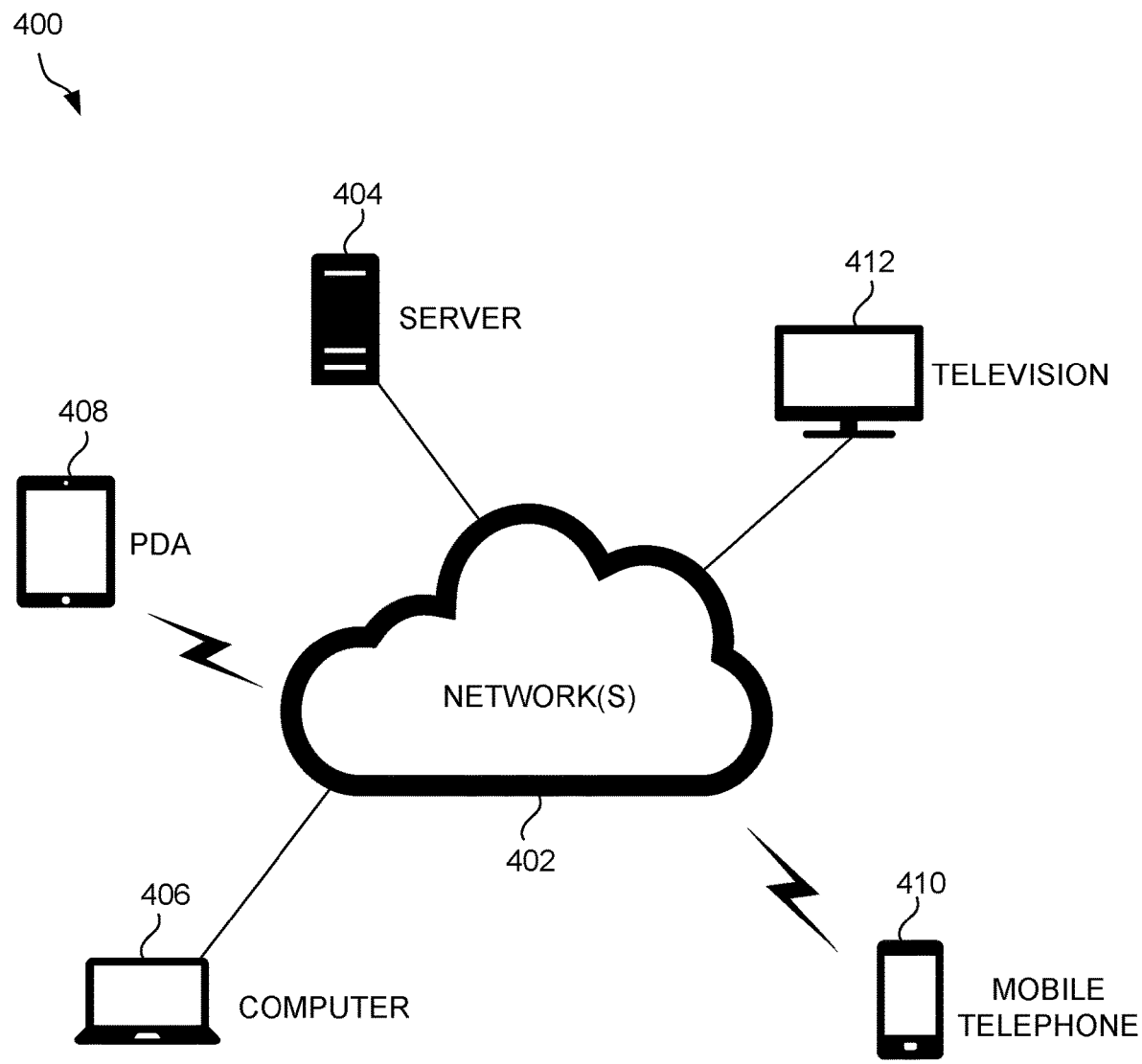
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
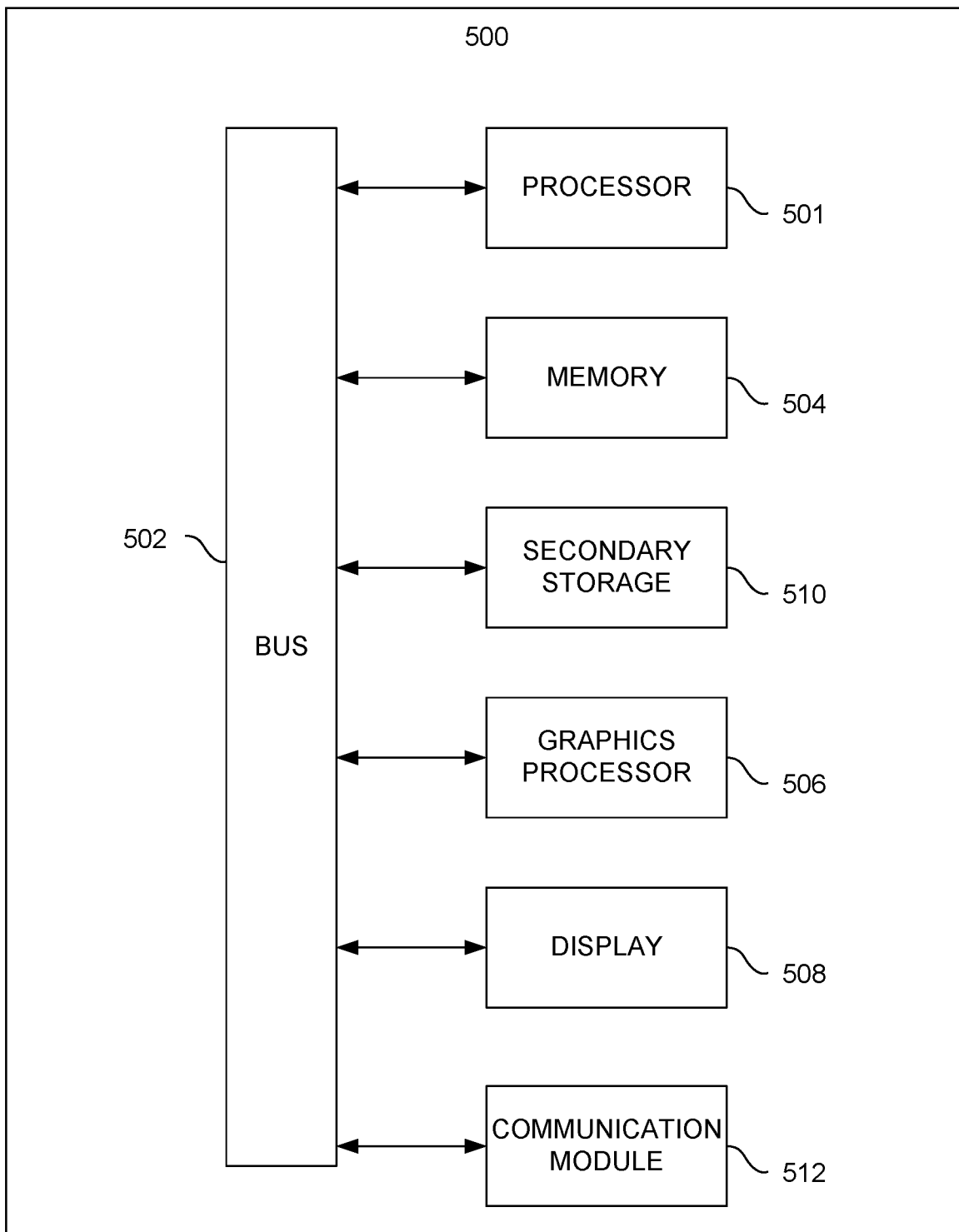
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
    obtain input that defines a plurality of parameter values associated with an enterprise for which a 5G private network is to be deployed, wherein the plurality of parameter values include at least:
    characteristics of the enterprise,
    quality of service requirements for the 5G private network, and
    capabilities of the 5G private network;
    process the plurality of parameter values by a machine learning model to infer, for the enterprise, an optimal deployment scenario for the 5G private network, wherein the optimal deployment scenario is selected by the machine learning model from among a plurality of available deployment scenarios that are existing deployment configurations for use in implementing 5G private networks;
    output an indication of the optimal deployment scenario as a recommendation for deploying the 5G private network for the enterprise;
    select a network service from a catalog of network services that is configured to deploy the optimal deployment scenario; and
    initiate the network service to deploy the optimal deployment scenario for the enterprise.

2. The non-transitory computer-readable media of claim 1, wherein the plurality of parameter values further include:
    security requirements for the 5G private network,
    number of devices to be connected to the 5G private network,
    budget for the 5G private network, and
    budget for maintenance of the 5G private network.

3. The non-transitory computer-readable media of claim 1, wherein the characteristics of the enterprise includes:
    size of the enterprise, and
    market within which the enterprise operates.

4. The non-transitory computer-readable media of claim 1, wherein the quality of service requirements include:
    reliability requirements,
    connection speed requirements, and
    latency requirements.

5. The non-transitory computer-readable media of claim 1, wherein the input is provided in a user interface of an application by one or more representatives of the enterprise.

6. The non-transitory computer-readable media of claim 1, wherein the input is provided in a user interface of an application by a sales agent in communication with one or more representatives of the enterprise.

7. The non-transitory computer-readable media of claim 1, wherein the machine learning model is generated by training a machine learning algorithm using training data that includes previous deployment scenarios used for enterprises with corresponding parameter values.

8. The non-transitory computer-readable media of claim 1, wherein the plurality of available deployment scenarios include a physically-isolated 5G private network.

9. The non-transitory computer-readable media of claim 8, wherein the physically-isolated 5G private network is independent of a mobile operator's public 5G network and wherein components of the 5G private network are deployed within a premise of the enterprise and are private and dedicated to the enterprise.

10. The non-transitory computer-readable media of claim 1, wherein the plurality of available deployment scenarios include radio access network (RAN) sharing between a private network and a public network.

11. The non-transitory computer-readable media of claim 8, wherein the RAN sharing between the private network and the public network includes:
deploying components of the 5G private network within a premise of the enterprise,
wherein only 5G base stations are shared between the private network and the public network and remaining components of the 5G private network are private and dedicated to the enterprise.

12. The non-transitory computer-readable media of claim 1, wherein the plurality of available deployment scenarios include RAN and control plane sharing between a private network and a public network.

13. The non-transitory computer-readable media of claim 8, wherein the RAN and control plane sharing between the private network and the public network includes:
deploying a first subset of components of the 5G private network within a premise of the enterprise that are private and dedicated to the enterprise, and
deploying a second subset of components of the 5G private network within the premise of the enterprise that are shared between the private network and the public network,
deploying a third subset of components of the 5G private network in a mobile operator's public 5G network,
wherein the first subset of components are physically separated between the private network and the public network,
wherein the second subset of components and the third subset of components are logically separated between the private network and the public network.

14. The non-transitory computer-readable media of claim 1, wherein the plurality of available deployment scenarios include end to end network slicing including RAN and core sharing between a private network and a public network.

15. The non-transitory computer-readable media of claim 8, wherein the end to end network slicing including RAN and core sharing between a private network and a public network includes:
deploying only 5G base stations within a premise of the enterprise,
deploying at least two other components of the 5G private network in a mobile operator's public 5G network,
wherein components of the 5G private network are logically separated between the private network and the public network.

16. The non-transitory computer-readable media of claim 1, wherein the plurality of available deployment scenarios include:
a physically-isolated 5G private network,
radio access network (RAN) sharing between a private network and a public network,
RAN and control plane sharing between a private network and a public network, and
end to end network slicing including RAN and core sharing between a private network and a public network.

17. The non-transitory computer-readable media of claim 1, wherein the plurality of available deployment scenarios are associated with different resource requirements and different prices.

18. A method, comprising:
at a computer system:
obtaining input that defines a plurality of parameter values associated with an enterprise for which a 5G private network is to be deployed, wherein the plurality of parameter values include at least:
characteristics of the enterprise,
quality of service requirements for the 5G private network, and
capabilities of the 5G private network;
processing the plurality of parameter values by a machine learning model to infer, for the enterprise, an optimal deployment scenario for the 5G private network, wherein the optimal deployment scenario is selected by the machine learning model from among a plurality of available deployment scenarios that are existing deployment configurations for use in implementing 5G private networks;
outputting an indication of the optimal deployment scenario as a recommendation for deploying the 5G private network for the enterprise;
selecting a network service from a catalog of network services that is configured to deploy the optimal deployment scenario; and
initiating the network service to deploy the optimal deployment scenario for the enterprise.

19. A system, comprising:
a non-transitory memory storing instructions; and
one or more processors in communication with the non-transitory memory that execute the instructions to:
obtain input that defines a plurality of parameter values associated with an enterprise for which a 5G private network is to be deployed, wherein the plurality of parameter values include at least:
characteristics of the enterprise,
quality of service requirements for the 5G private network, and
capabilities of the 5G private network;
process the plurality of parameter values by a machine learning model to infer, for the enterprise, an optimal deployment scenario for the 5G private network, wherein the optimal deployment scenario is selected by the machine learning model from among a plurality of available deployment scenarios that are existing deployment configurations for use in implementing 5G private networks;
output an indication of the optimal deployment scenario as a recommendation for deploying the 5G private network for the enterprise;
select a network service from a catalog of network services that is configured to deploy the optimal deployment scenario; and
initiate the network service to deploy the optimal deployment scenario for the enterprise.

* * * * *